(12) United States Patent
Héroux et al.

(10) Patent No.: US 10,365,425 B1
(45) Date of Patent: Jul. 30, 2019

(54) OPTICAL WAVEGUIDE CROSSING STRUCTURE

(71) Applicant: INTERNATIONAL BUSINESS MACHINES CORPORATION, Armonk, NY (US)

(72) Inventors: Jean Benoit Héroux, Tokyo (JP); Hsiang Han Hsu, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/032,440

(22) Filed: Jul. 11, 2018

(51) Int. Cl.
*G02B 6/12* (2006.01)
*F21V 8/00* (2006.01)
*G02B 6/42* (2006.01)

(52) U.S. Cl.
CPC ....... *G02B 6/0065* (2013.01); *G02B 6/12004* (2013.01); *G02B 6/42* (2013.01); *G02B 2006/12083* (2013.01); *G02B 2006/12166* (2013.01)

(58) Field of Classification Search
CPC .... G02B 6/0065; G02B 6/12004; G02B 6/42; G02B 2006/12083; G02B 2006/12166
See application file for complete search history.

(56) References Cited

U.S. PATENT DOCUMENTS

| | | | |
|---|---|---|---|
| 6,674,950 B2* | 1/2004 | Yang | G02B 6/12004 385/129 |
| 6,937,808 B2* | 8/2005 | Kawase | G02B 6/3608 385/137 |
| 8,747,751 B2* | 6/2014 | Duer | G02B 27/56 385/12 |
| 9,360,622 B2* | 6/2016 | Goodwill | G02B 6/125 |
| 9,817,185 B2 | 11/2017 | Sacher et al. | |
| 2005/0213873 A1* | 9/2005 | Piede | G02B 6/12004 385/14 |

(Continued)

FOREIGN PATENT DOCUMENTS

WO 2017152256 A1 9/2017

OTHER PUBLICATIONS

Ishigure, "Low-Loss Design and Fabrication of Multimode Polymer Optical Waveguide Circuit with Crossing for High Density Optical PCB", 2013 Electronic Components & Technology Conference, May 2013, pp. 297-304.

*Primary Examiner* — Daniel Petkovsek
(74) *Attorney, Agent, or Firm* — Tutunjian & Bitetto, P.C.; Vazken Alexanian

(57) ABSTRACT

A method for fabricating an optical waveguide crossing structure. The method includes preparing a plate structure including a crossing part array and a guiding part array, each crossing part of the crossing part array being arranged at a gap from a plurality of guiding parts of the guiding part array. The method further includes preparing a waveguide structure including a first waveguide core array, a second waveguide core array and a tank, the tank being formed by removing a crossing region of the first waveguide core array and the second waveguide core array. The method further includes injecting an underfill into the tank. The method further includes depositing the plate structure on the waveguide structure so that the crossing part array and the guiding part array are inserted in the tank. The method further includes curing the underfill.

13 Claims, 15 Drawing Sheets

(56) References Cited

U.S. PATENT DOCUMENTS

2013/0101256 A1    4/2013   Heroux et al.
2015/0212268 A1    7/2015   Goodwill
2017/0362652 A1   12/2017   Zhong et al.

* cited by examiner

FIG.11A
FIG.11B
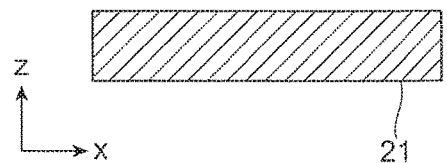
FIG.11C
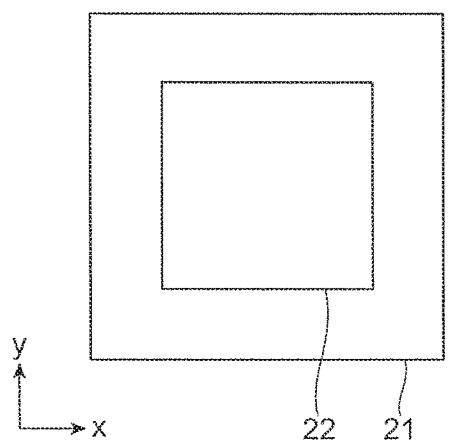
FIG.11D
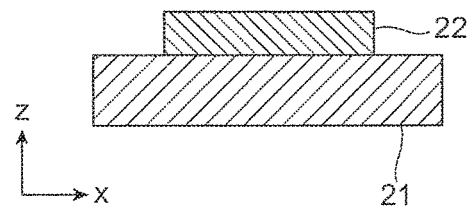
FIG.11E
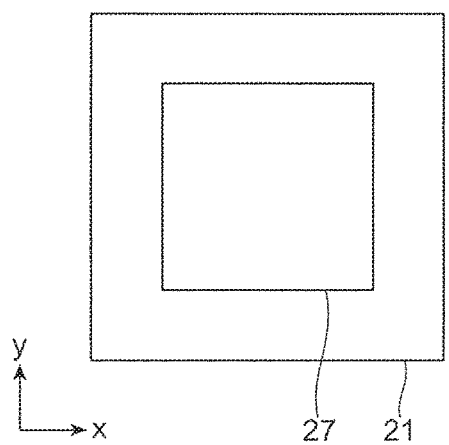
FIG.11F
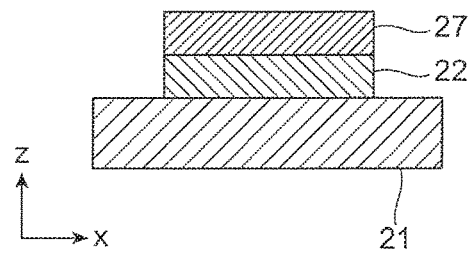

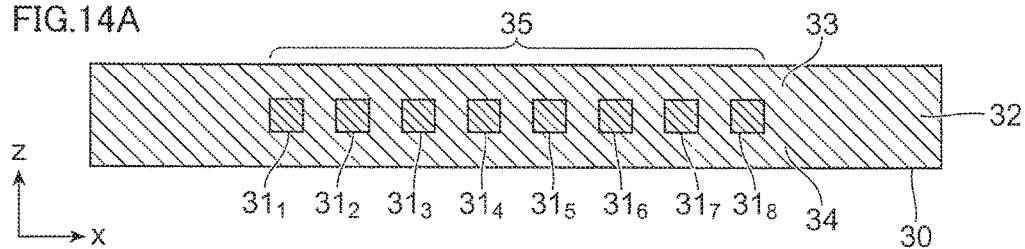
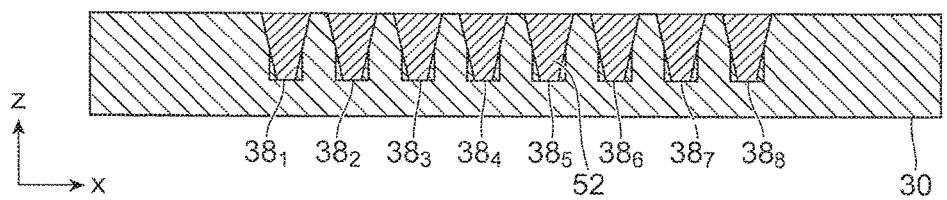
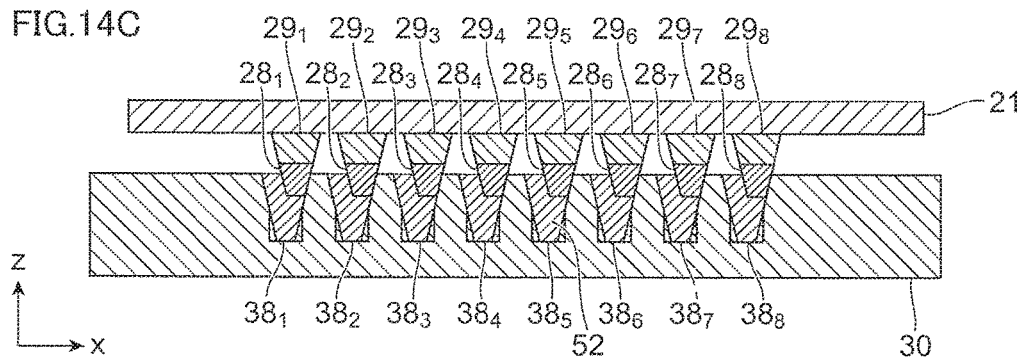
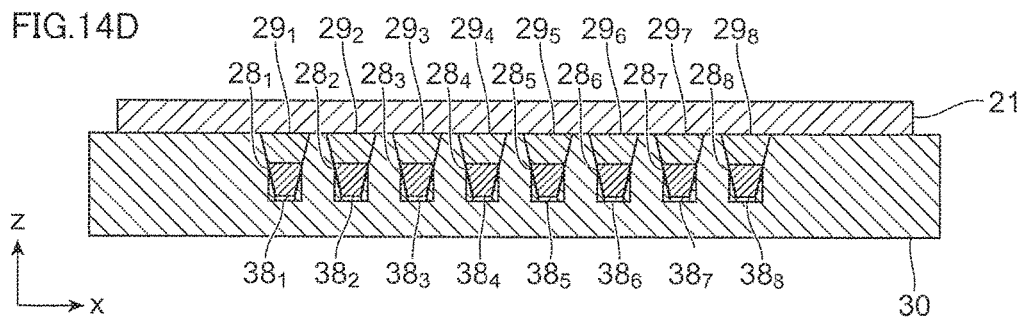
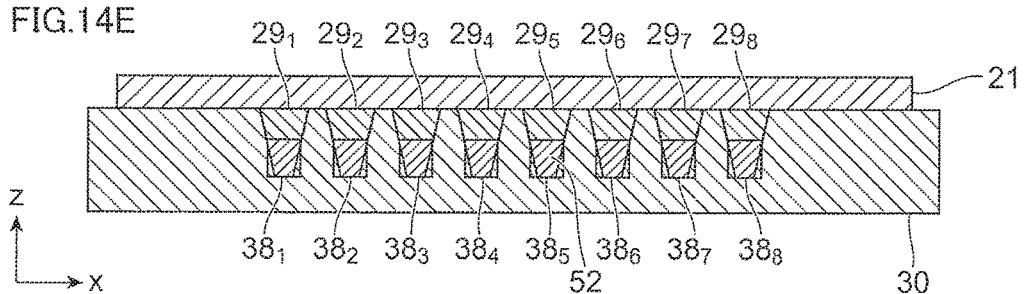

OPTICAL WAVEGUIDE CROSSING STRUCTURE

BACKGROUND

Technical Field

The present invention relates to an optical waveguide crossing structure.

Description of the Related Art

Recently, various techniques have been known regarding waveguide structures in which core sections can cross each other

SUMMARY

According to an embodiment of the present invention, there is provided a method for fabricating an optical waveguide crossing structure. The method includes preparing a plate structure including a crossing part array and a guiding part array, each crossing part of the crossing part array being arranged at a gap from a plurality of guiding parts of the guiding part array, the crossing part array and the guiding part array having a refractive index close to a refractive index of a waveguide core. The method further includes preparing a waveguide structure including a first waveguide core array, a second waveguide core array and a tank, the tank being formed by removing a crossing region of the first waveguide core array and the second waveguide core array. The method further includes injecting an underfill into the tank, the underfill having a refractive index close to a refractive index of a cladding. The method further includes depositing the plate structure on the waveguide structure so that the crossing part array and the guiding part array are inserted in the tank. The method further includes curing the underfill.

According to another embodiment of the present invention, there is provided a method for fabricating an optical waveguide crossing structure. The method includes preparing a plate structure including a crossing part array, the crossing part array having a refractive index higher than a refractive index of a waveguide core. The method further includes preparing a waveguide structure including a first waveguide core array, a second waveguide core array and a hole array, each hole of the hole array being formed by removing a crossing section of a corresponding waveguide core of the first waveguide core array and a corresponding waveguide core of the second waveguide core array. The method further includes injecting an underfill into the hole array, the underfill having a refractive index close to the refractive index of the waveguide core. The method further includes depositing the plate structure on the waveguide structure so that each crossing part of the crossing part array is inserted in a corresponding hole of the hole array. The method further includes curing the underfill.

According to yet another embodiment of the present invention, there is provided a plate structure including a plate, a cladding layer, and a core layer. The cladding layer is deposited on the plate. The core layer is deposited on the cladding layer. The core layer includes a core part array, the core part array being to be inserted in a crossing region of a first waveguide core array and a second waveguide core array of a waveguide structure and thereby to reduce loss of light in the crossing region.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIGS. 11A, 11B, 11C, 11D, 11E, and 11F depict top views and side views of semi-products of the plate structure while the plate structure fabrication step is being executed.

FIGS. 14A, 14B, 14C, 14D, and 14E depict cross section views along line A-A of FIG. 7B while the waveguide structure preparation step, the groove making step, the underfill injection step and the plate structure positioning step are being executed.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Optical waveguides enable waveguide core arrays to cross each other to perform shuffling functions or the like, which is not possible with electrical waveguides. On the other hand, crossings of the waveguide core arrays induce loss of light in the crossing. Several types of optical waveguide crossing structures have been previously proposed to decrease the loss of light. However, it is very difficult to fabricate such optical waveguide crossing structures.

In view of this, the exemplary embodiments provide methods for easily fabricating optical waveguide crossing structures which decrease the loss of light in the crossing of the waveguide core arrays.

First, an explanation is given on the fabrication of an optical waveguide crossing structure according to the first exemplary embodiment.

Figure 1:
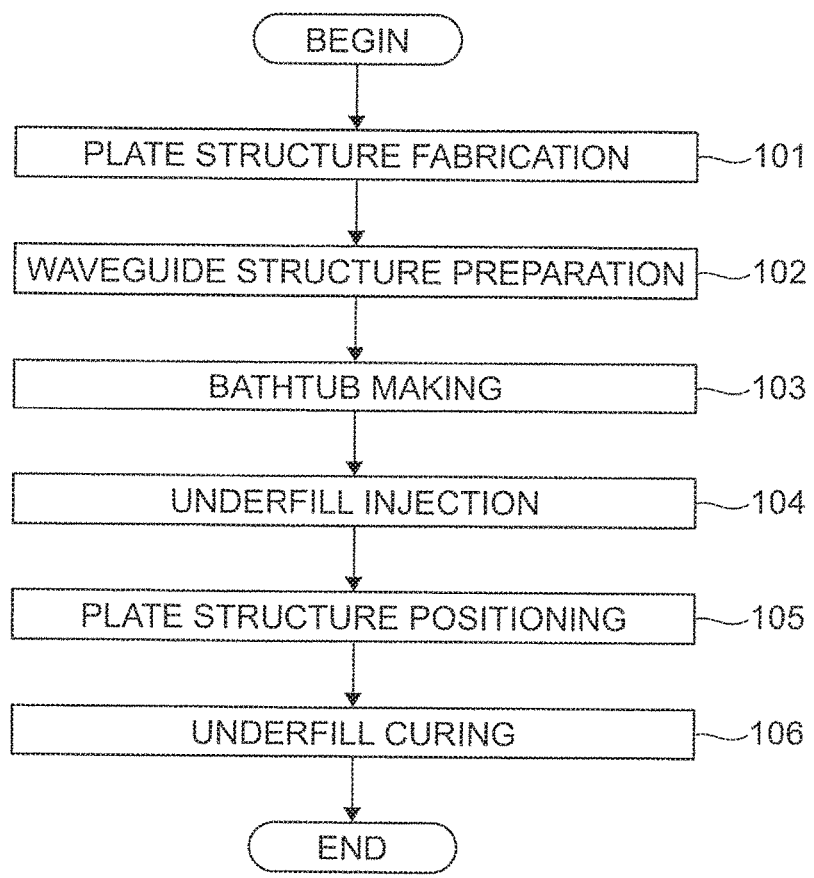
FIG. 1 depicts a flowchart representing an example of a fabrication procedure of an optical waveguide crossing structure according to a first exemplary embodiment of the present invention.

Referring to FIG. 1, there is shown a flowchart representing an example of a fabrication procedure of the optical waveguide crossing structure according to the first exemplary embodiment. As shown in FIG. 1, the fabrication procedure may include, in the time order, a plate structure fabrication step 101, a waveguide structure preparation step 102, a bathtub making step 103, an underfill injection step 104, a plate structure positioning step 105, and an underfill curing step 106.

Figure 2:
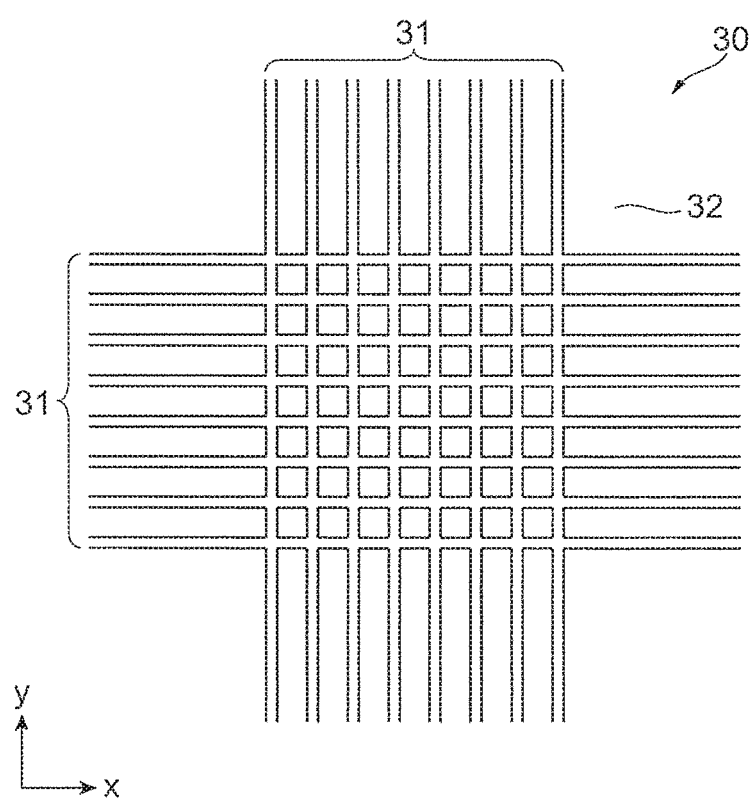
FIG. 2 depicts a top view of a waveguide structure to be used in the fabrication procedure according to the first exemplary embodiment.

Referring to FIG. 2, there is shown a top view of a waveguide structure 30 to be used in the fabrication procedure according to the first exemplary embodiment. In FIG. 2, the right-hand direction and the upper direction are the positive directions of the x-axis and the y-axis, respectively. As shown in FIG. 2, the waveguide structure 30 may include waveguide core arrays 31 and a middle cladding 32. Note that since this top view is assumed to be a view in a case where a top cladding has been removed, the top cladding is not shown in FIG. 2. In the first exemplary embodiment, a refractive index of a material of waveguide cores (hereinafter referred to as a "core index") is assumed to be "n1", and a refractive index of a material of claddings (hereinafter referred to as a "cladding index") is assumed to be "n2".

Figure 3A:
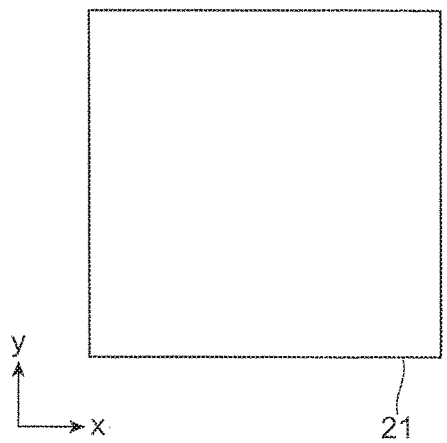
FIGS. 3A, 3B, 3C, 3D, 3E, and 3F depict top views and side views of semi-products of a plate structure while a plate structure fabrication step is being executed.
Figure 3B:
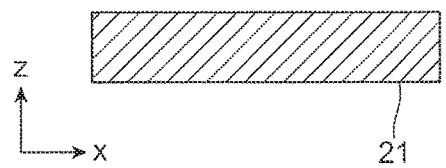
Figure 3C:
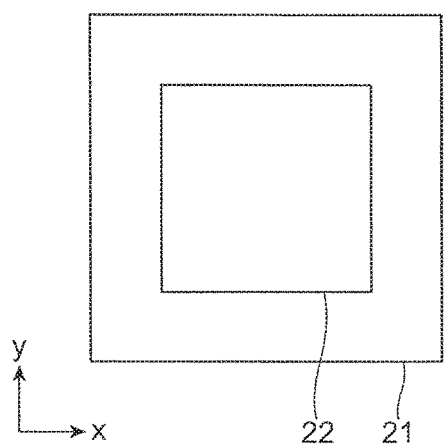
Figure 3D:
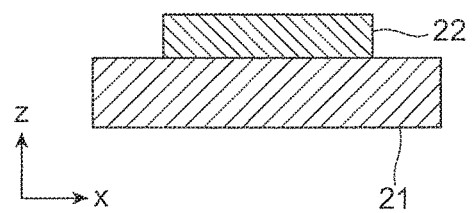
Figure 3E:
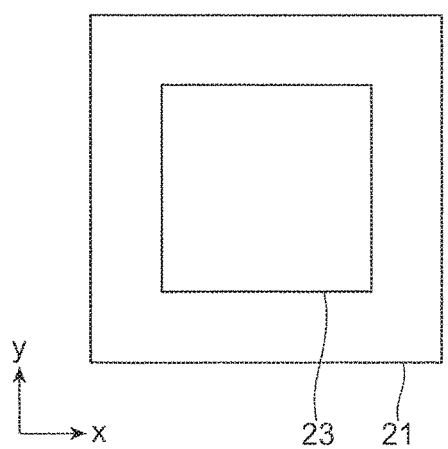
Figure 3F:
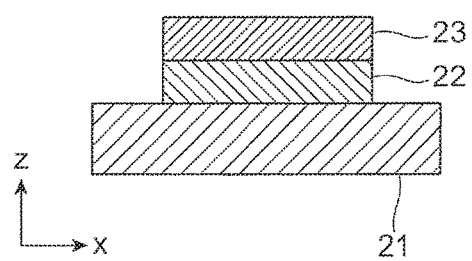

Referring to FIGS. 3A to 3F, there are shown top views and side views of semi-products of a plate structure 20 while the plate structure fabrication step 101 is being executed. In FIGS. 3A, 3C, and 3E, the right-hand direction and the upper direction are the positive directions of the x-axis and the y-axis, respectively, and in FIGS. 3B, 3D, and 3F, the right-hand direction and the upper direction are the positive directions of the x-axis and the z-axis, respectively. First, as shown in FIGS. 3A and 3B, a plate 21 may be prepared at the first step of the plate structure fabrication step 101. Next, as shown in FIGS. 3C and 3D, a cladding layer 22 may be deposited on the plate 21 at the second step of the plate structure fabrication step 101. In the first exemplary embodiment, the cladding layer 22 is assumed to have a refractive index close to the cladding index "n2". Subsequently, as shown in FIGS. 3E and 3F, a core layer 23 may be deposited on the cladding layer 22 at the third step of the plate structure fabrication step 101. In the first exemplary embodiment, the core layer 23 is assumed to have a refractive index close to the core index "n1".

Figure 4A:
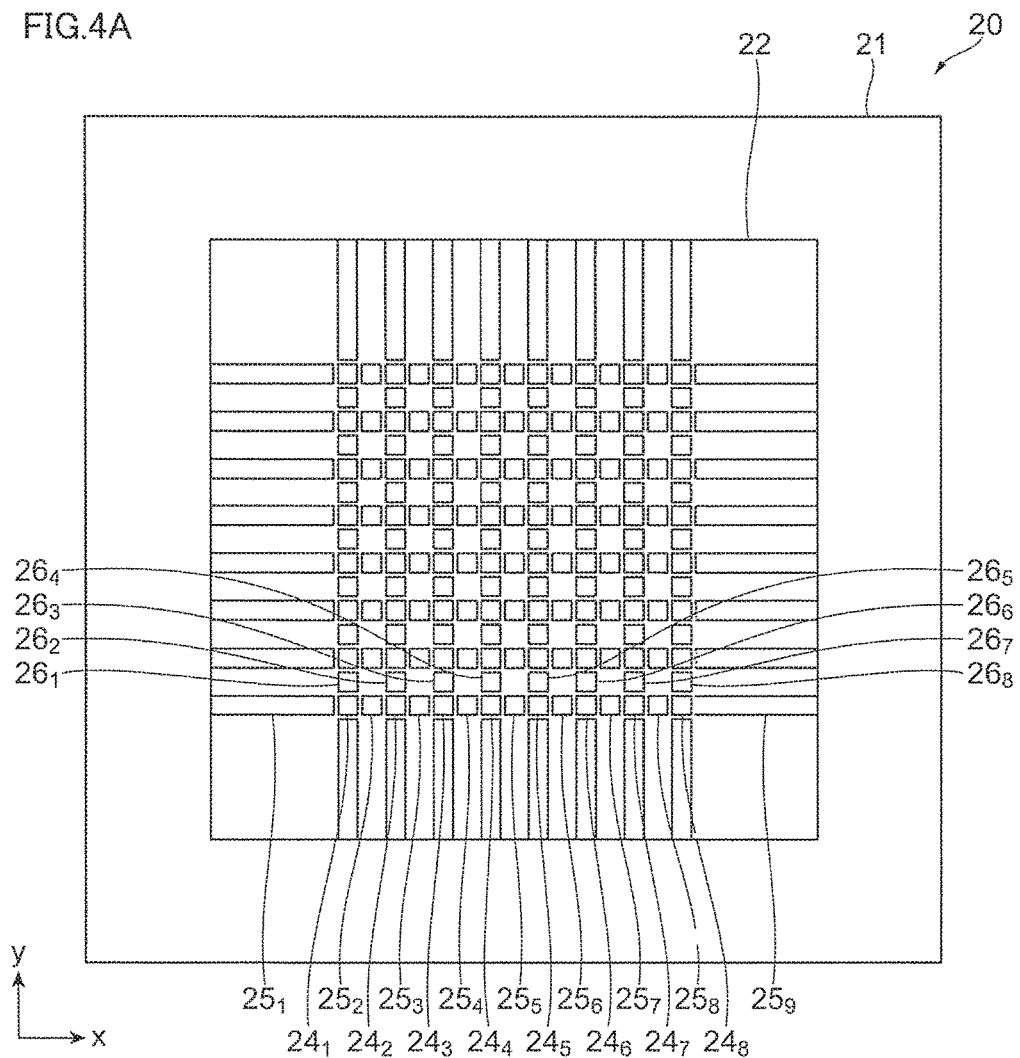
FIGS. 4A and 4B depict a top view and a side view, respectively, of the plate structure after the plate structure fabrication step is completed.
Figure 4B:
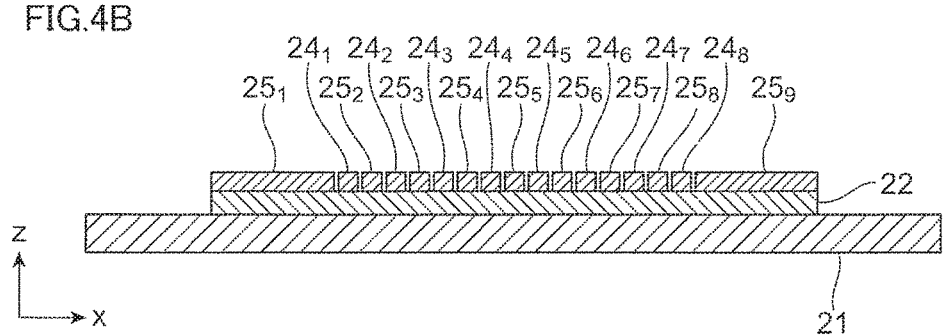

Referring to FIGS. 4A and 4B, there are shown a top view and a side view, respectively, of the plate structure 20 after the plate structure fabrication step 101 is completed. In FIG. 4A, the right-hand direction and the upper direction are the positive directions of the x-axis and the y-axis, respectively, and in FIG. 4B, the right-hand direction and the upper direction are the positive directions of the x-axis and the z-axis, respectively. As shown in FIGS. 4A and 4B, a pattern may be made in the core layer 23 using a 2.5D printing technique at the fourth step of the plate structure fabrication step 101. The pattern may include a crossing part array including multiple crossing parts and a guiding part array including multiple guiding parts. Each of the crossing parts may correspond to one of crossing sections of a waveguide core array 31 in the x direction and a waveguide core array 31 in the y direction. Each of the guiding parts may correspond to one of guiding sections, each of which is a section between two crossing sections or a section between a crossing section and an edge. Further, each of the crossing parts may be arranged at a gap from the four adjacent guiding parts. For example, FIG. 4A shows crossing parts $24_1$ to $24_8$, and guiding parts $25_1$ to $25_9$ and $26_1$ to $26_8$. Meanwhile, since FIG. 4B is a cross section view along a line passing through the crossing parts $24_1$ to $24_8$, FIG. 4B shows only the crossing parts $24_1$ to $24_8$ and the guiding parts $25_1$ to $25_9$. In addition, each of the crossing parts and the guiding parts may have almost a cuboid shape.

Figure 5A:
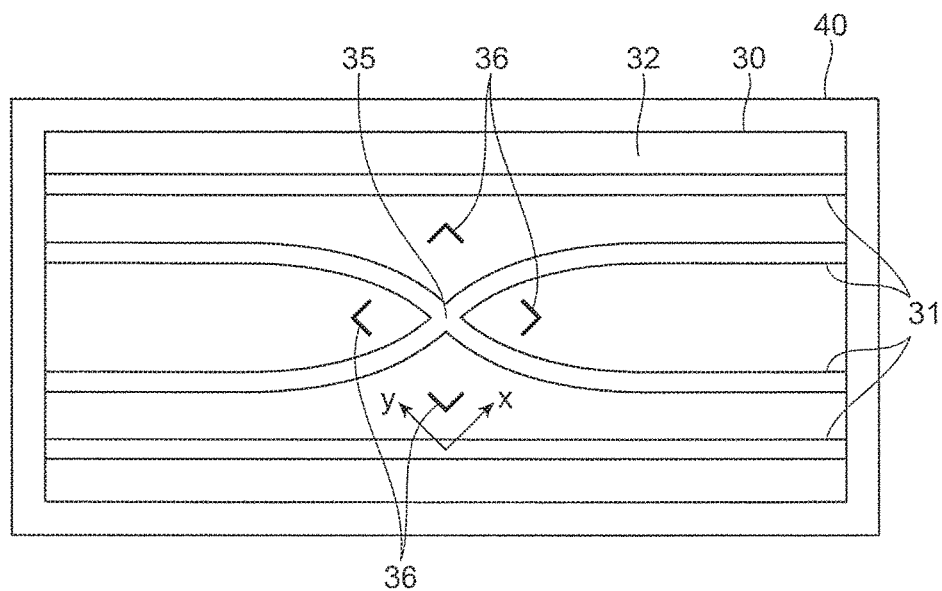
FIGS. 5A and 5B depict a top view and a side view, respectively, of an assembly of the waveguide structure and a substrate after a waveguide structure preparation step is completed.
Figure 5B:
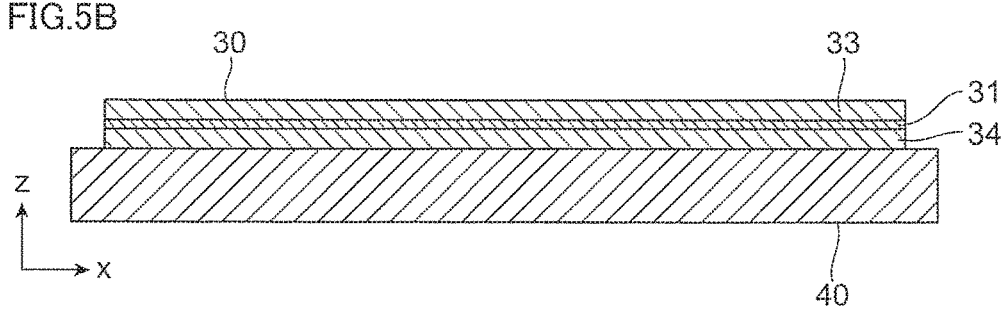

Referring to FIGS. 5A and 5B, there are shown a top view and a side view, respectively, of an assembly of the waveguide structure 30 and a substrate 40 after the waveguide structure preparation step 102 is completed. In FIG. 5A, the upper right direction and the upper left direction are the positive directions of the x-axis and the y-axis, respectively, and in FIG. 5B, the right-hand direction and the upper direction are the positive directions of the x-axis and the z-axis, respectively. As shown in FIGS. 5A and 5B, the assembly of the waveguide structure 30 and the substrate 40 may be prepared at the waveguide structure preparation step 102. The waveguide structure 30 may include waveguide core arrays 31, a middle cladding 32, a top cladding 33, and a bottom cladding 34. Note that since the top view of FIG. 5A is assumed to be a view in a case where the top cladding 33 has been removed, the top cladding 33 is not shown in FIG. 5A. Each of the waveguide core arrays 31 is assumed to include multiple waveguide cores, although represented by only one line. In FIG. 5A, two of the waveguide core arrays 31 are assumed to cross each other to form a crossing region 35. Thus, the waveguide structure 30 may include alignment marks 36 on the middle cladding 32 for x-y alignment of the plate structure 20. The alignment marks 36 may be made using the same material as the waveguide cores. The alignment marks 36 may be precisely symmetric with respect to the crossing region 35. The alignment marks 36 may match approximately the dimensions of the plate 21. Further, an area surrounded by the alignment marks 36, namely, an area on which the plate 21 is to be deposited is larger than an area of the crossing region 35 for stability of the plate structure 20. Note that although four alignment marks 36 are shown in FIG. 5A, the waveguide structure 30 may include at least one alignment mark. In addition, the surface of the waveguide structure 30 should be flat to enable precise position alignment of the plate structure 20. Thus, the thickness of the top cladding 33 may be uniformed by a method such as spinning the waveguide structure 30.

Figure 6A:
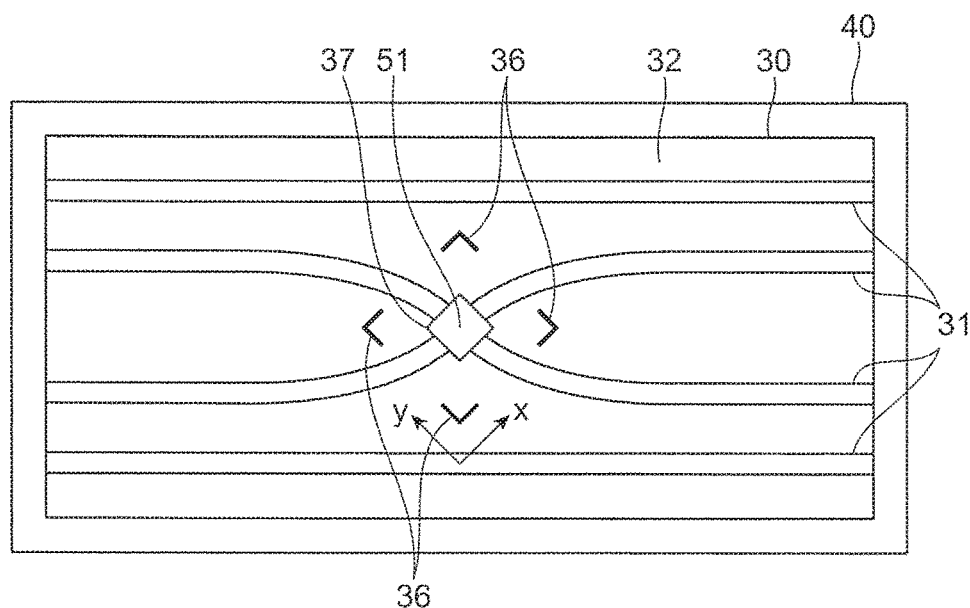
FIGS. 6A and 6B depict a top view and a side view, respectively, of an assembly of the waveguide structure and the substrate after a bathtub making step and an underfill injection step are completed.
Figure 6B:
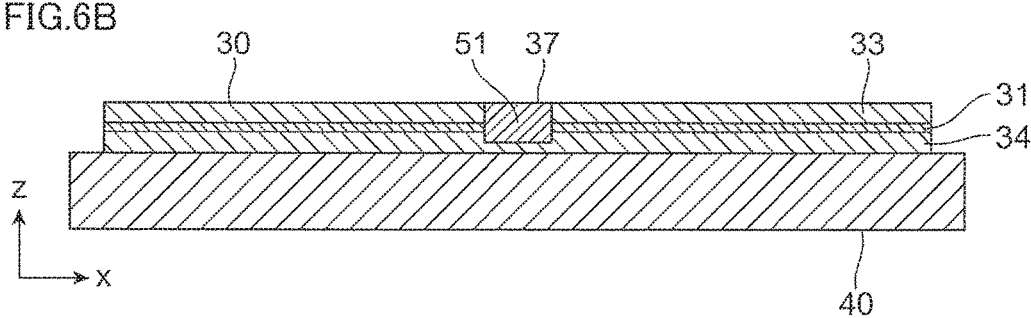

Referring to FIGS. 6A and 6B, there are shown a top view and a side view, respectively, of an assembly of the waveguide structure 30 and the substrate 40 after the bathtub making step 103 and the underfill injection step 104 are completed. In FIG. 6A, the upper right direction and the upper left direction are the positive directions of the x-axis and the y-axis, respectively, and in FIG. 6B, the right-hand direction and the upper direction are the positive directions of the x-axis and the z-axis, respectively. First, as shown in FIGS. 6A and 6B, a bathtub 37 may be cut into the crossing region 35 at the bathtub making step 103. The bathtub 37 may be cut using a technique such as laser ablation. Although a general name for the bathtub 37 is a tank, the tank is called a "bathtub" from its shape. The area of the opening of the bathtub 37 may be much smaller than the area of the plate 21, namely, the area surrounded by the alignment marks 36. Further, the size of the bathtub 37 may be slightly larger than the size of the crossing region 35 for alignment tolerance. The alignment marks 36 may remain unchanged and be visible after this step. Next, as shown in FIGS. 6A and 6B, an underfill 51 may be injected into the bathtub 37 at the underfill injection step 104. The underfill 51 may be a liquid. In the first exemplary embodiment, the underfill 51 is assumed to have a refractive index close to the cladding index "n2".

Figure 7A:
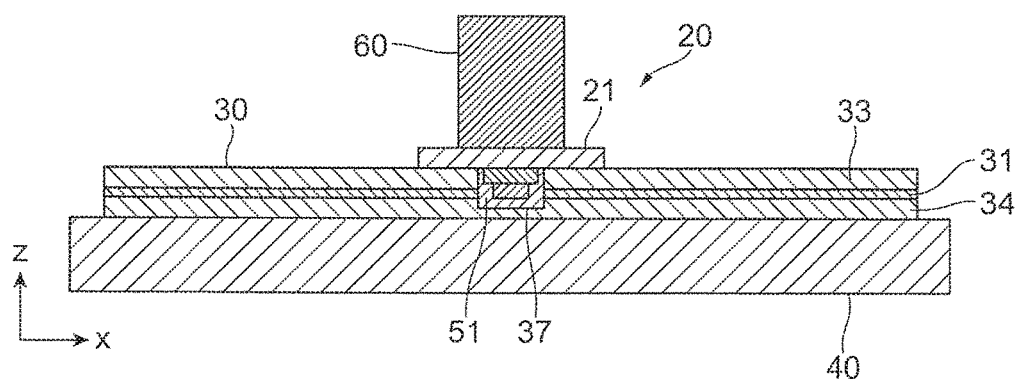
FIGS. 7A and 7B depict a side view and a top view, respectively, of an assembly of the plate structure, the waveguide structure and the substrate after a plate structure positioning step is completed.
Figure 7B:
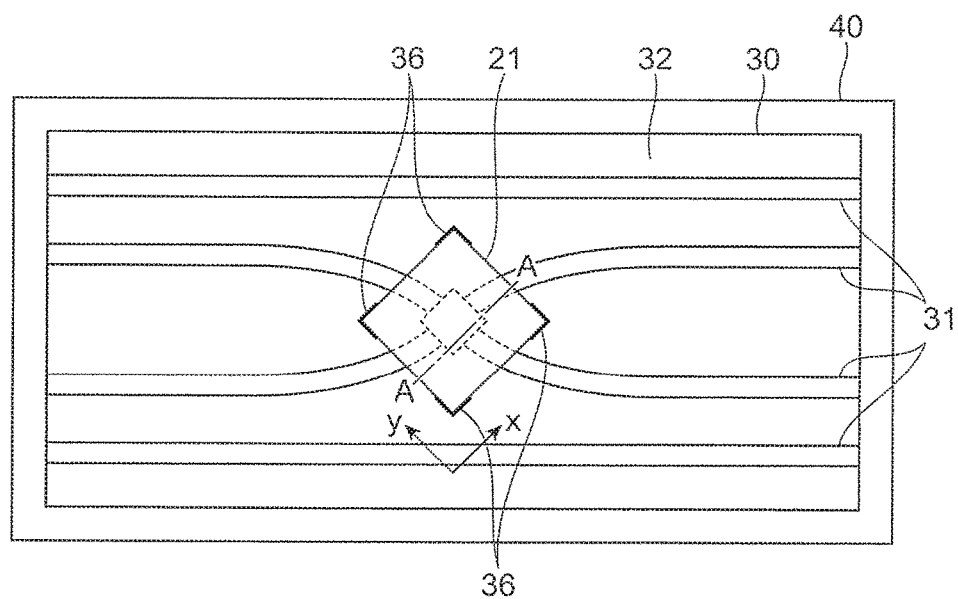

Referring to FIGS. 7A and 7B, there are shown a side view and a top view, respectively, of an assembly of the plate structure 20, the waveguide structure 30 and the substrate 40 after the plate structure positioning step 105 is completed. In FIG. 7A, the right-hand direction and the upper direction are the positive directions of the x-axis and the z-axis, respectively, and in FIG. 7B, the upper right direction and the upper left direction are the positive directions of the x-axis and the y-axis, respectively. First, as shown in FIGS. 7A and 7B, the plate structure 20 may be turned upside down and deposited on the waveguide structure 30 from the top in a single process at the first step of the plate structure positioning step 105. Specifically, the plate 21 may be held by a vacuum chuck 60. Next, the position of the plate structure 20 in the z direction may be calibrated so that optical loss is minimized at the second step of the plate structure positioning step 105. Specifically, the pressure of the vacuum chuck 60 may be adjusted using a pressure sensor (not shown).

Referring to FIGS. 8A to 8D, there are shown cross section views along line A-A of FIG. 7B while the steps 102 to 105 are being executed. In FIGS. 8A to 8D, the right-hand direction and the upper direction are the positive directions of the x-axis and the z-axis, respectively.

Figure 8A:
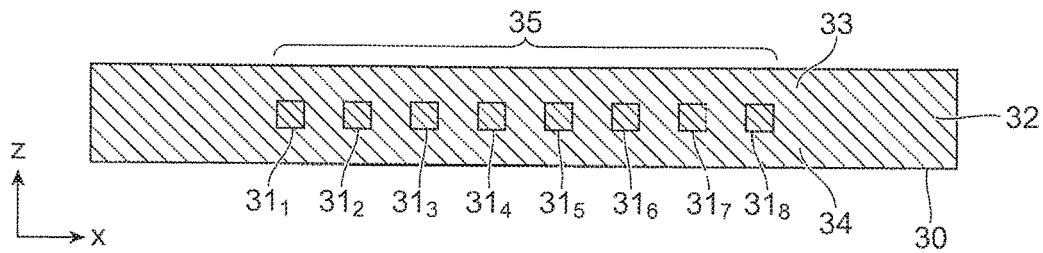
FIGS. 8A, 8B, 8C, and 8D depict cross section views along line A-A of FIG. 7B while the waveguide structure preparation step, the bathtub making step, the underfill injection step and the plate structure positioning step are being executed.

FIG. 8A shows a cross section view of the waveguide structure 30 after the step 102 is completed. As shown in FIG. 8A, the waveguide structure 30 may include crossing sections of waveguide cores 311 to 318 in the crossing region 35, and further include claddings (the middle cladding 32, the top cladding 33, and the bottom cladding 34).

Figure 8B:
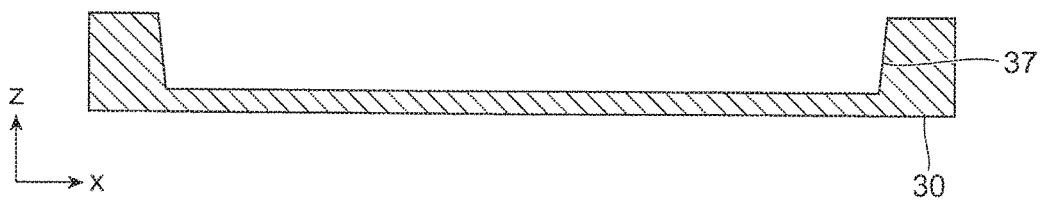

FIG. 8B shows a cross section view of the waveguide structure 30 after the step 103 is completed. As shown in FIG. 8B, the bathtub 37 may be cut into the crossing region 35, and thus the crossing sections of the waveguide cores 311 to 318 are removed.

Figure 8C:
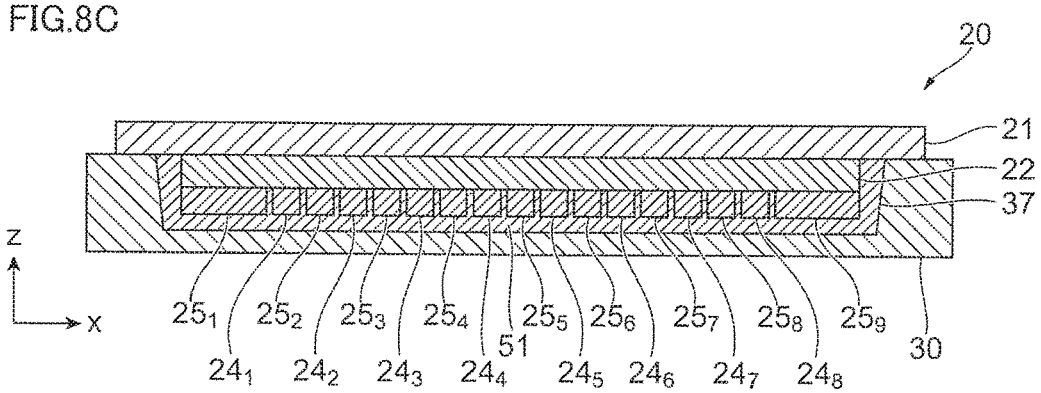
Figure 8D:
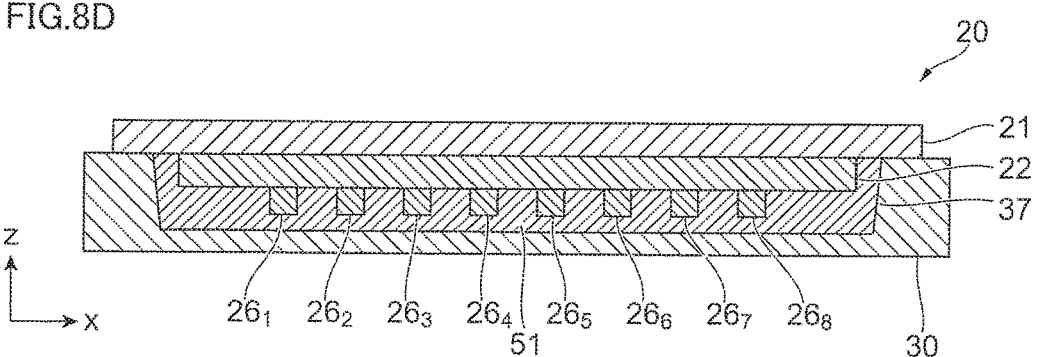

FIGS. 8C and 8D show cross section views of the waveguide structure 30 after the steps 104 and 105 are completed. As shown in FIGS. 8C and 8D, the underfill 51 may be inserted in the bathtub 37, and the plate structure 20 may be deposited on the waveguide structure 30. The cross section view of FIG. 8C is a view in a case where the line A-A passes through the crossing parts $24_1$ to $24_8$. Thus, the crossing parts $24_1$ to $24_8$ and the guiding parts $25_1$ to $25_9$ are shown in FIG. 8C. Meanwhile, the cross section view of FIG. 8D is a view in a case where the line A-A passes through the guiding parts $26_1$ to $26_8$. Thus, the guiding parts $26_1$ to $26_8$ are shown in FIG. 8D. In FIGS. 8C and 8D, the refractive index of the crossing parts $24_1$ to $24_8$, and the guiding parts $25_1$ to $25_9$ and $26_1$ to $26_8$ is assumed to be close to the core index "n1", and the refractive index of the cladding layer 22 and the underfill 51 is assumed to be close to the cladding index "n2".

Figure 9:
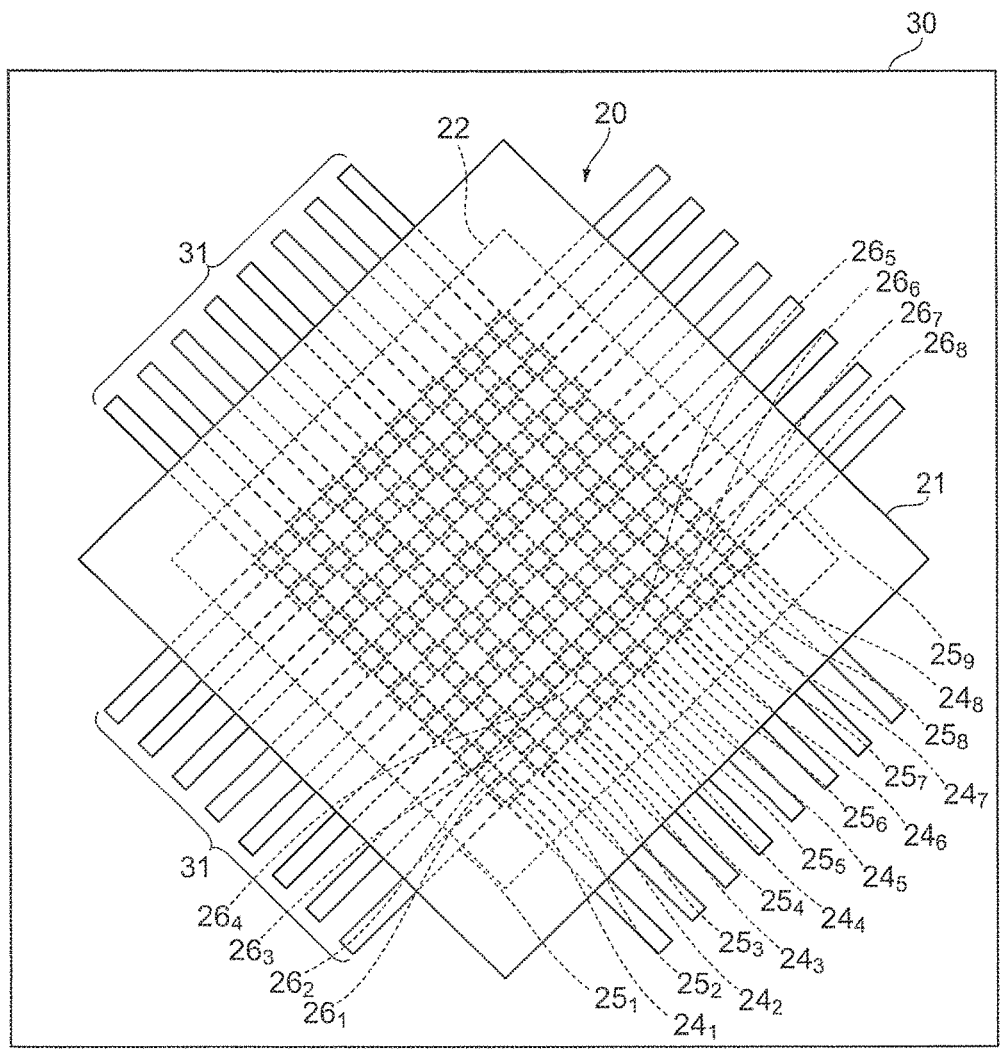
FIG. 9 depicts a top view of an assembly of the plate structure, the waveguide structure and the substrate after an underfill curing step is completed.

Referring to FIG. 9, there is shown a top view of an assembly of the plate structure 20, the waveguide structure 30 and the substrate 40 after the underfill curing step 106 is completed. Since this top view of FIG. 9 is assumed to be a view of a limited area on the waveguide structure 30, the substrate 40 is not shown. First, as shown in FIG. 9, the plate structure 20 may sit on the waveguide structure 30 so that the crossing parts (for example, the crossing parts $24_1$ to $24_8$) are inserted in the crossing sections of the two waveguide core arrays 31, and the guiding parts (for example, the guiding parts $25_1$ to $25_9$ and $26_1$ to $26_8$) are inserted in the guiding sections between two of the crossing sections. Next, the underfill 51 may be cured at the underfill curing step 106. Thus, the plate structure 20 may be fixed to the waveguide structure 30.

Secondly, an explanation is given on the fabrication of an optical waveguide crossing structure according to the second exemplary embodiment.

Figure 10:
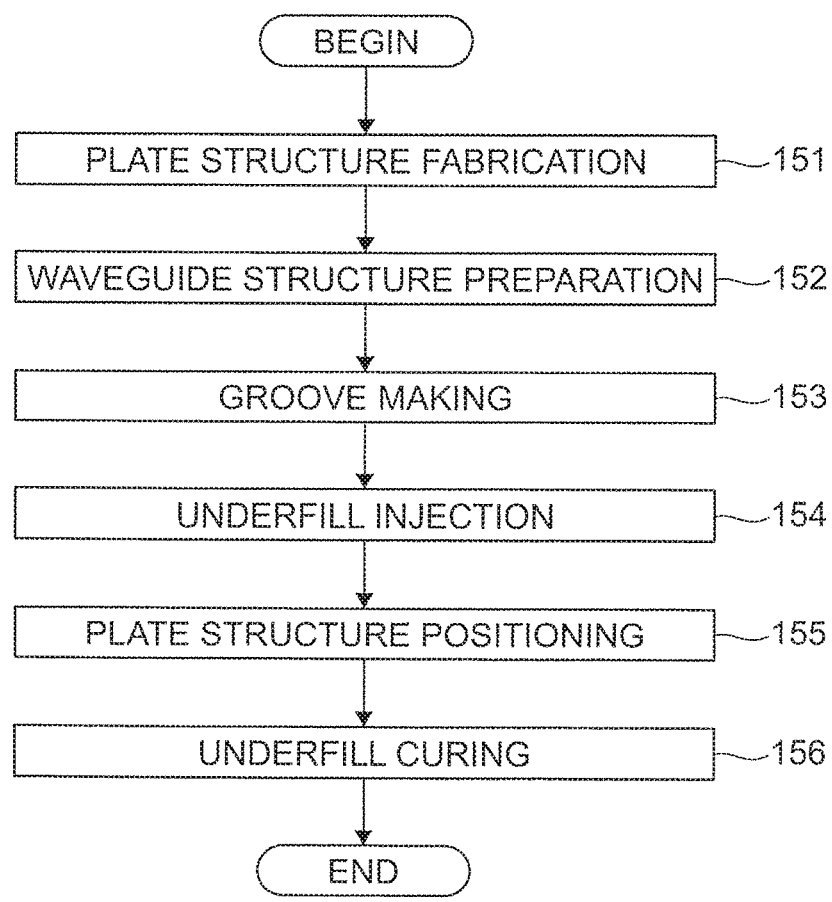
FIG. 10 depicts a flowchart representing an example of a fabrication procedure of the optical waveguide crossing structure according to a second exemplary embodiment.

Referring to FIG. 10, there is shown a flowchart representing an example of a fabrication procedure of the optical waveguide crossing structure according to the second exemplary embodiment. As shown in FIG. 10, the fabrication procedure may include, in the time order, a plate structure fabrication step 151, a waveguide structure preparation step 152, a groove making step 153, an underfill injection step 154, a plate structure positioning step 155, and an underfill curing step 156.

A waveguide structure 30 to be used in the fabrication procedure according to the second exemplary embodiment is similar to that shown in FIG. 2, and thus its description is omitted. However, in the second exemplary embodiment, a refractive index of a material of waveguide cores (hereinafter referred to as a "core index") is assumed to be "n2", and a refractive index of a material of claddings (hereinafter referred to as a "cladding index") is assumed to be "n3", unlike in the first exemplary embodiment.

Referring to FIGS. 11A to 11F, there are shown top views and side views of semi-products of a plate structure 20 while the plate structure fabrication step 151 is being executed. In FIGS. 11A, 11C, and 11E, the right-hand direction and the upper direction are the positive directions of the x-axis and the y-axis, respectively, and in FIGS. 11B, 11D, and 11F, the right-hand direction and the upper direction are the positive directions of the x-axis and the z-axis, respectively. First, as shown in FIGS. 11A and 11B, a plate 21 may be prepared at the first step of the plate structure fabrication step 151. Next, as shown in FIGS. 11C and 11D, a cladding layer 22 may be deposited on the plate 21 at the second step of the plate structure fabrication step 151. In the second exemplary embodiment, the cladding layer 22 is assumed to have a refractive index close to the cladding index "n3". Subsequently, as shown in FIGS. 11E and 11F, a core layer 27 may be deposited on the cladding layer 22 at the third step of the plate structure fabrication step 151. In the second exemplary embodiment, the core layer 27 is assumed to have a refractive index "n1" higher than the core index "n2".

Figure 12A:
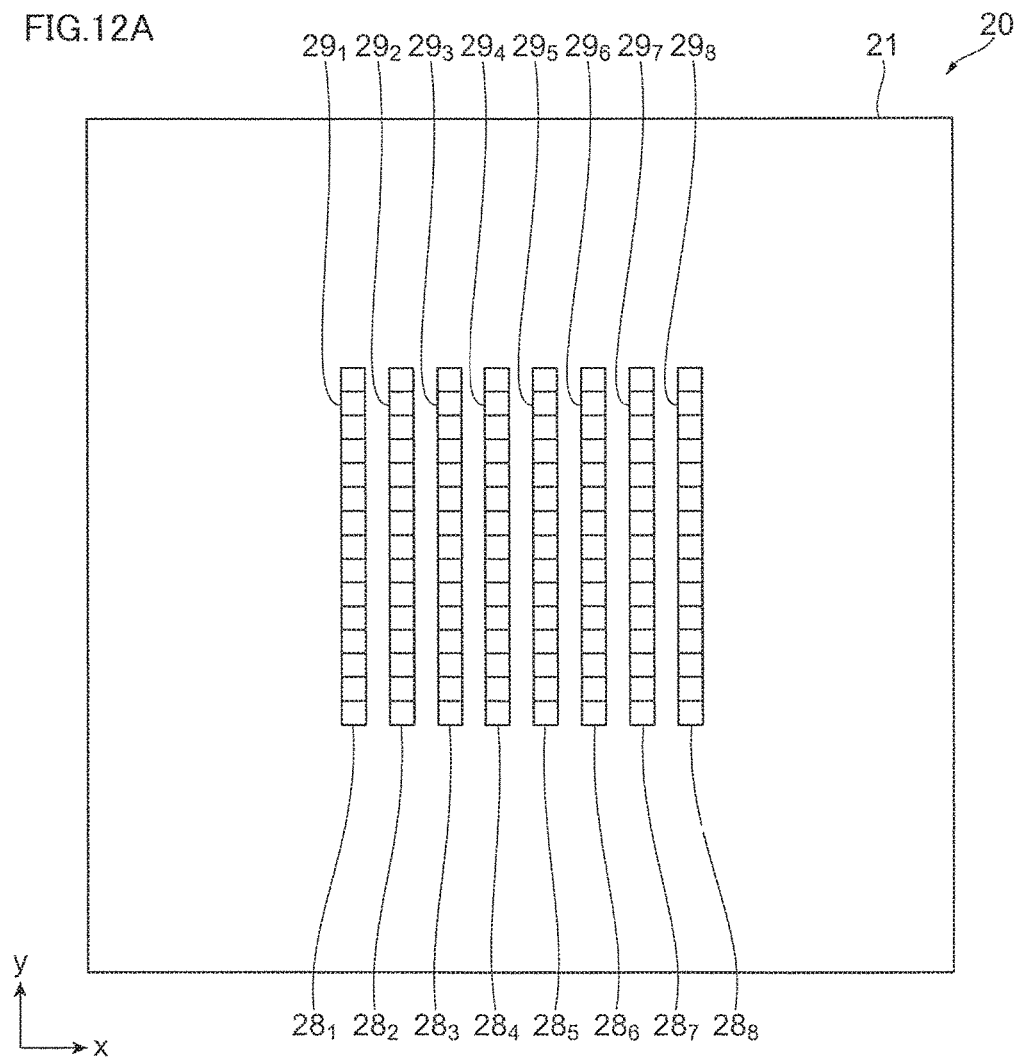
FIGS. 12A and 12B depict a top view and a side view, respectively, of the plate structure after the plate structure fabrication step is completed.
Figure 12B:
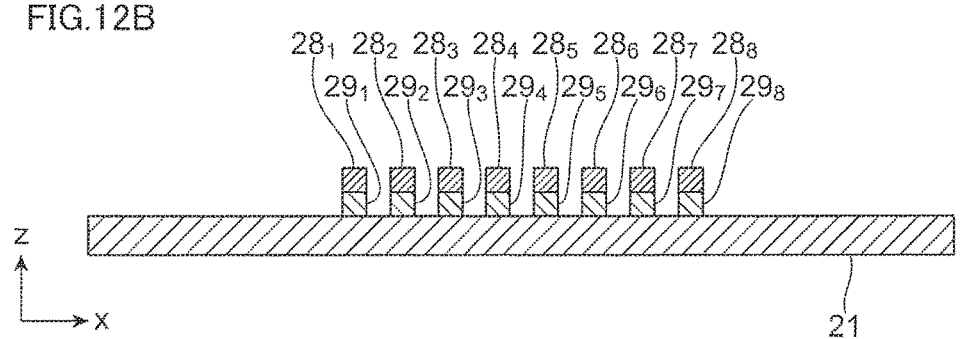

Referring to FIGS. 12A and 12B, there are shown a top view and a side view, respectively, of the plate structure 20 after the plate structure fabrication step 151 is completed. In FIG. 12A, the right-hand direction and the upper direction are the positive directions of the x-axis and the y-axis, respectively, and in FIG. 12B, the right-hand direction and the upper direction are the positive directions of the x-axis and the z-axis, respectively. As shown in FIGS. 12A and 12B, a pattern may be made in the cladding layer 22 and the core layer 27 using a 2.5D printing technique at the fourth step of the plate structure fabrication step 151. The pattern made in the core layer 27 may include a crossing part array including multiple crossing parts, and the pattern made in the cladding layer 22 may include a supporting part array including multiple supporting parts. Each of the crossing parts may correspond to one of crossing sections of a waveguide core array 31 in the x direction and a waveguide core array 31 in the y direction. Each of the supporting parts may correspond to one of waveguide cores of a waveguide core array 31 in the y direction. That is, parts such as the guiding parts in the first exemplary embodiment may not exist on positions of the supporting parts corresponding to guiding sections, each of which is a section between two crossing sections. Thus, in FIG. 12A, each of the supporting parts is assumed to support eight crossing parts. For example, FIG. 12A shows crossing parts $28_1$ to $28_8$ and supporting parts $29_1$ to $29_8$. Note that each of the crossing parts $28_1$ to $28_8$ is one of the eight crossing parts supported by a corresponding one of the supporting parts $29_1$ to $29_8$. Meanwhile, since FIG. 12B is a cross section view along a line passing through the crossing parts $28_1$ to $28_8$, FIG. 12B shows the crossing parts $28_1$ to $28_8$ and the supporting parts $29_1$ to $29_8$. In addition, each of the crossing parts and the supporting parts may have almost a cuboid shape.

An assembly of the waveguide structure 30 and a substrate 40 after the waveguide structure preparation step 152 is completed is the same as that shown in FIGS. 5A and 5B, and thus it is omitted.

An assembly of the waveguide structure 30 and the substrate 40 after the groove making step 153 and the underfill injection step 154 are completed is similar to that shown in FIGS. 6A and 6B. However, in the second exemplary embodiment, a groove array may be cut into the crossing region 35 instead of the bathtub 37, unlike in the first exemplary embodiment.

Figure 13A:
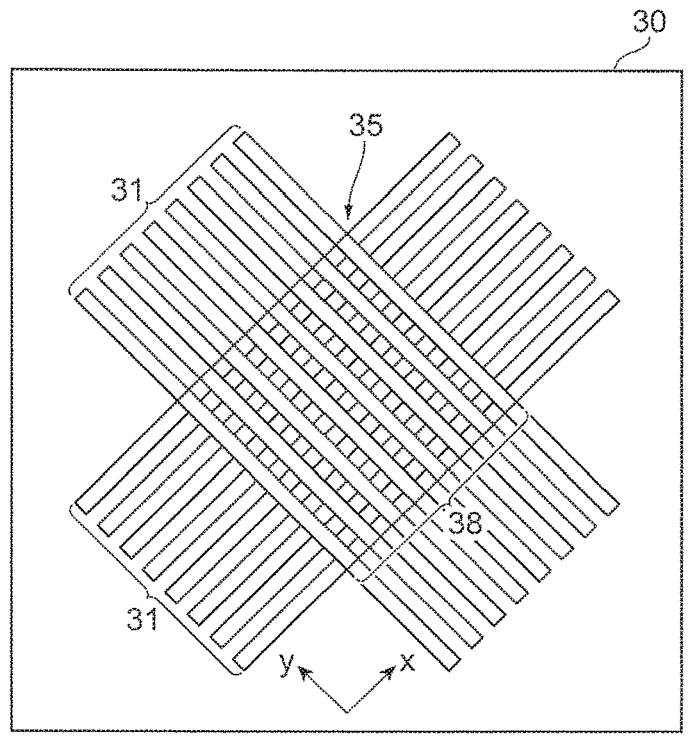
FIGS. 13A and 13B depict top views of a crossing region after a groove making step is completed and after the underfill injection step is completed, respectively.
Figure 13B:
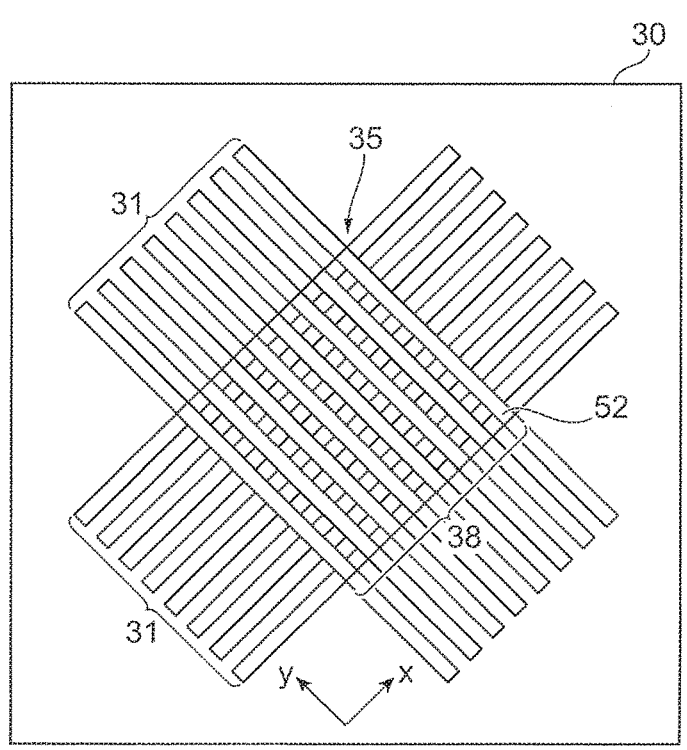

Referring to FIGS. 13A and 13B, there are shown top views of the crossing region 35 after the groove making step 153 is completed and after the underfill injection step 154 is completed, respectively. In each of FIGS. 13A and 13B, the upper right direction and the upper left direction are the positive directions of the x-axis and the y-axis, respectively. First, as shown in FIG. 13A, a groove array 38 may be cut into the crossing region 35 at the groove making step 153. The groove array 38 may be cut using a technique such as laser ablation matching a waveguide core array 31 in the y direction. The area of the opening of the groove array 38 may be much smaller than the area of the plate 21, namely, the area surrounded by the alignment marks 36. The alignment marks 36 may remain unchanged and be visible after this step. Next, as shown in FIG. 13B, an underfill 52 may be injected into the groove array 38 at the underfill injection step 154. The underfill 52 may be a liquid. In the second exemplary embodiment, the underfill 52 is assumed to have a refractive index close to the core index "n2".

An assembly of the plate structure 20, the waveguide structure 30 and the substrate 40 after the plate structure positioning step 155 is completed is similar to that shown in FIGS. 7A and 7B. The first step of the plate structure positioning step 155 is the same as the first step of the plate structure positioning step 105. However, the second step of the plate structure positioning step 155 is slightly different from the second step of the plate structure positioning step 105. That is, mechanical fine alignment in the x direction may first be performed using the groove array 38. Next, the position of the plate structure 20 in the y direction and the z direction may be fine-tuned so that optical loss is minimized. Specifically, the pressure of the vacuum chuck 60 may be adjusted using a pressure sensor (not shown).

Referring to FIGS. 14A to 14E, there are shown cross section views along line A-A of FIG. 7B while the steps 152 to 155 are being executed. In FIGS. 14A to 14E, the right-hand direction and the upper direction are the positive directions of the x-axis and the z-axis, respectively.

FIG. 14A shows a cross section view of the waveguide structure 30 after the step 152 is completed. As shown in FIG. 14A, the waveguide structure 30 may include crossing sections of waveguide cores 311 to 318 in the crossing region 35, and further include claddings (the middle cladding 32, the top cladding 33, and the bottom cladding 34).

FIG. 14B shows a cross section view of the waveguide structure 30 after the step 153 and the step 154 are completed. As shown in FIG. 14B, grooves $38_1$ to $38_8$ each may be cut with a slight angle into a corresponding one of the crossing sections of the waveguide cores 311 to 318, and the underfill 52 may be inserted in the grooves $38_1$ to $38_8$.

FIG. 14C shows a cross section view of the waveguide structure 30 while the step 155 is being executed. As shown in FIG. 14C, the plate structure 20 may be lowered above the waveguide structure 30. The grooves $38_1$ to $38_8$ may be used for mechanical fine alignment of the plate structure 20 in the x direction. The mechanical fine alignment may be performed using pressure data in the z direction sensed by a pressure sensor (not shown).

FIGS. 14D and 14E show cross section views of the waveguide structure 30 after the step 155 is completed. The cross section view of FIG. 14D is a view in a case where the line A-A passes through the crossing parts $28_1$ to $28_8$. Thus, the crossing parts $28_1$ to $28_8$ and the supporting parts $29_1$ to $29_8$ are shown in FIG. 14D. Meanwhile, the cross section view of FIG. 14E is a view in a case where the line A-A does not pass through any of the crossing parts. Thus, only the supporting parts $29_1$ to $29_8$ are shown in FIG. 14E. Further, the underfill 52 also may be shown in FIG. 14E. In FIGS. 14D and 14E, the refractive index "n1" of the crossing parts $28_1$ to $28_8$ is assumed to be higher than the core index "n2". The refractive index of the supporting parts $29_1$ to $29_8$ is assumed to be close to the cladding index "n3". The refractive index of the underfill 52 is assumed to be close to the core index "n2".

Figure 15:
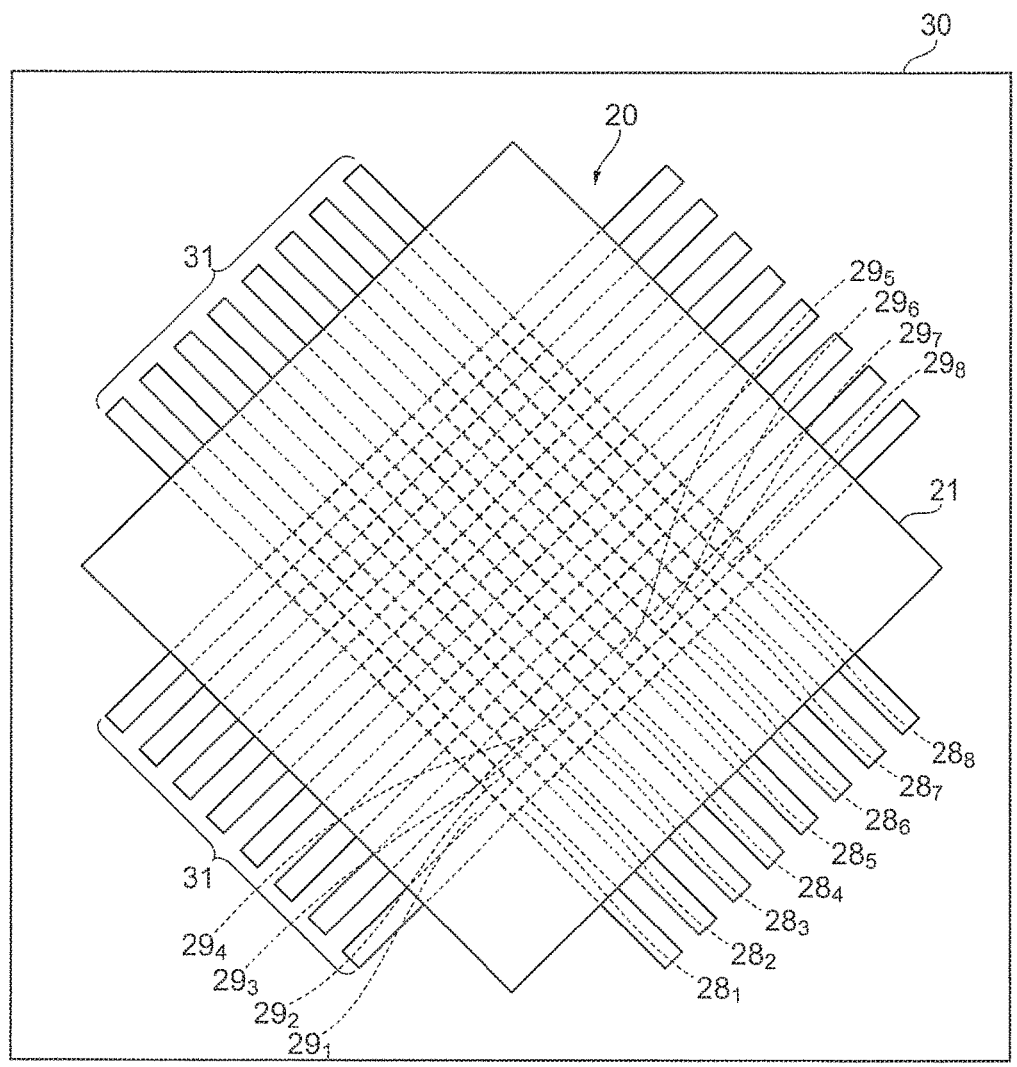
FIG. 15 depicts a top view of an assembly of the plate structure, the waveguide structure and the substrate after the underfill curing step is completed.

Referring to FIG. 15, there is shown a top view of an assembly of the plate structure 20, the waveguide structure 30 and the substrate 40 after the underfill curing step 156 is completed. Since this top view of FIG. 15 is assumed to be a view of a limited area on the waveguide structure 30, the substrate 40 is not shown. First, as shown in FIG. 15, the plate structure 20 may sit on the waveguide structure 30 so that the crossing parts (for example, the crossing parts $28_1$ to $28_8$) are inserted in the crossing sections of the two waveguide core arrays 31, and the supporting parts (for example, the supporting parts $29_1$ to $29_8$) are inserted in the grooves each corresponding to one of the waveguide cores. Next, the underfill 52 may be cured at the underfill curing step 156. Thus, the plate structure 20 may be fixed to the waveguide structure 30.

In the second exemplary embodiment, the groove array 38 including the grooves $38_1$ to $38_8$ along one of the two waveguide core arrays 31 is assumed to be made, and each of the supporting parts $29_1$ to $29_8$ is assumed to support multiple crossing parts to be inserted in a corresponding one of the grooves $38_1$ to $38_8$. However, a hole array including holes in the crossing sections of the two waveguide core arrays 31 may be made. A row of the holes along one of the waveguide cores may constitute a corresponding one of the grooves $38_1$ to $38_8$. Further, each of the supporting parts $29_1$ to $29_8$ may support one of the crossing parts $28_1$ to $28_8$ to be inserted in a corresponding one of the crossing sections. In this case, FIGS. 12A and 14E are changed so that the supporting parts $29_1$ to $29_8$ are not shown.

Note that although each of the waveguide core arrays 31 includes eight waveguide cores in the foregoing description, the number of the waveguide cores included in each of the waveguide core arrays 31 is not limited to this. Each of the waveguide core arrays 31 may include less than eight or more than eight waveguide cores.

Further, although two waveguide core arrays 31 are assumed to cross each other perpendicularly in the foregoing description, the angle at which the two waveguide core arrays 31 cross each other is not limited to this. The two waveguide core arrays 31 may cross each other at an arbitrary angle.

With the fabrication methods according to the exemplary embodiments, optical waveguide crossing structures having negligible optical loss can be easily fabricated.

Moreover, with the fabrication methods according to the exemplary embodiments, the plate structure 20 can be fabricated separately from the assembly of the waveguide structure 30 and the substrate 40, and made to be exchangeable. Thus, failure of the fabrication of the plate structure 20 does not pose a damage risk to the assembly. As a result, optical waveguide crossing structures can be fabricated by a high-yield process.

What is claimed is:

1. A method for fabricating an optical waveguide crossing structure, the method comprising:
   preparing a plate structure including a crossing part array and a guiding part array, each crossing part of the crossing part array being arranged at a gap from a plurality of guiding parts of the guiding part array, the crossing part array and the guiding part array having a refractive index substantially similar to a refractive index of a waveguide core;
   preparing a waveguide structure including a first waveguide core array, a second waveguide core array and a tank, the tank being formed by removing a crossing region of the first waveguide core array and the second waveguide core array;
   injecting an underfill into the tank, the underfill having a refractive index substantially similar to a refractive index of a cladding;
   depositing the plate structure on the waveguide structure so that the crossing part array and the guiding part array are inserted in the tank; and
   curing the underfill.

2. The method of claim 1, wherein preparing the plate structure includes:
   preparing a plate;
   depositing a cladding layer on the plate, the cladding layer having a refractive index substantially similar close to the refractive index of the cladding;
   depositing a core layer on the cladding layer, the core layer having a refractive index substantially similar to the refractive index of the waveguide core; and
   making the crossing part array and the guiding part array in the core layer.

3. The method of claim 2, wherein the plate has an area larger than an area of the crossing region.

4. The method of claim 1, wherein the waveguide structure includes at least one alignment mark for aligning the plate structure.

5. The method of claim 4, wherein the at least one alignment mark is symmetric with respect to the crossing region.

6. A method for fabricating an optical waveguide crossing structure, the method comprising:
   preparing a plate structure including a crossing part array, the crossing part array having a refractive index higher than a refractive index of a waveguide core;
   preparing a waveguide structure including a first waveguide core array, a second waveguide core array and a hole array, each hole of the hole array being formed by removing a crossing section of a corresponding waveguide core of the first waveguide core array and a corresponding waveguide core of the second waveguide core array;
   injecting an underfill into the hole array, the underfill having a refractive index substantially similar to the refractive index of the waveguide core;
   depositing the plate structure on the waveguide structure so that each crossing part of the crossing part array is inserted in a corresponding hole of the hole array; and
   curing the underfill.

7. The method of claim 6, wherein preparing the plate structure includes:
   preparing a plate;
   depositing a cladding layer on the plate, the cladding layer having a refractive index substantially similar to a refractive index of a cladding;
   depositing a core layer on the cladding layer, the core layer having a refractive index higher than the refractive index of the waveguide core; and
   making the crossing part array in the core layer.

8. The method of claim 7, wherein the plate has an area larger than an area of a crossing region of the first waveguide core array and the second waveguide core array.

9. The method of claim 7, wherein the preparing the plate structure further comprises making a supporting part array in the cladding layer, each supporting part of the supporting part array supporting a corresponding crossing part of the crossing part array.

10. The method of claim 7, wherein a plurality of holes of the hole array constitute a groove, the plurality of holes being located on a corresponding waveguide core of the first waveguide core array, the groove being formed by removing the corresponding waveguide core.

11. The method of claim 10, wherein the preparing the plate structure further comprises making a supporting part array in the cladding layer, each supporting part of the supporting part array supporting a plurality of crossing parts of the crossing part array, the plurality of crossing parts being inserted in the corresponding waveguide core.

12. The method of claim 6, wherein the waveguide structure includes at least one alignment mark for aligning the plate structure.

13. The method of claim 12, wherein the at least one alignment mark is symmetric with respect to a crossing region of the first waveguide core array and the second waveguide core array.

* * * * *